United States Patent [19]

Daub

[11] 3,911,753
[45] Oct. 14, 1975

[54] CONNECTING ROD AND CONNECTING ROD SYSTEMS FOR INTERNAL COMBUSTION ENGINE AND COMPRESSORS AND PARTITIONED CYLINDER FOR INTERNAL COMBUSTION ENGINE

[76] Inventor: Rudolph Daub, 9 Hickory Drive, North Caldwell, N.J. 07006

[22] Filed: Aug. 17, 1973

[21] Appl. No.: 389,286

[52] U.S. Cl. .................................. 74/40; 123/53 BP
[51] Int. Cl. ............................................ F16h 21/32
[58] Field of Search ...................... 74/40; 123/53 BP

[56] References Cited
FOREIGN PATENTS OR APPLICATIONS
23,658  1909  United Kingdom ............. 123/53 BP
605,474  8/1926  France .................................... 74/40

*Primary Examiner*—Samuel Scott
*Assistant Examiner*—Wesley S. Ratliff, Jr.
*Attorney, Agent, or Firm*—Nolte and Nolte

[57] ABSTRACT

In a U-cylinder engine or compressor, a novel connecting rod system is provided between the crank pin and the pistons so that the pistons are in phase at the top of the stroke. Moreover, piston slap is eliminated, so that a partition may be arranged in one of the cylinders to assist in the use of stratified charges. The connecting rod system includes a main connecting rod one end of which is connected to the crank pin, a cross head, means mounting the cross head for reciprocation parallel to the axes of the cylinders, the other end of the main connecting rod being connected to the cross head, and first and second auxiliary connecting rods each connecting the main connecting rod or the cross head to a respective one of the pistons. A novel connecting rod is also provided for the piston of an individual cylinder; here, too, a partition may be arranged in the cylinder to assist in the use of stratified charges. The end of the rod which is not connected to the crank shaft has rigidly connected thereto an arcuate rail which is slidably received in an arcuate groove formed in the piston. Also provided is a novel partitioned cylinder for an internal combustion engine.

14 Claims, 29 Drawing Figures

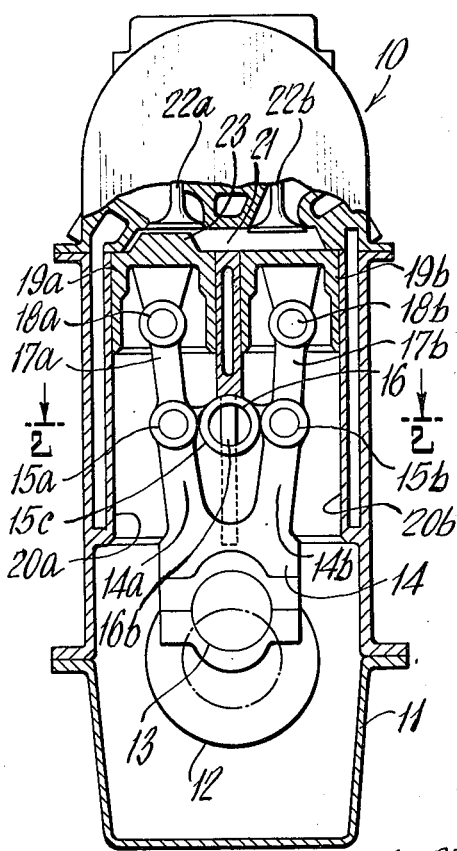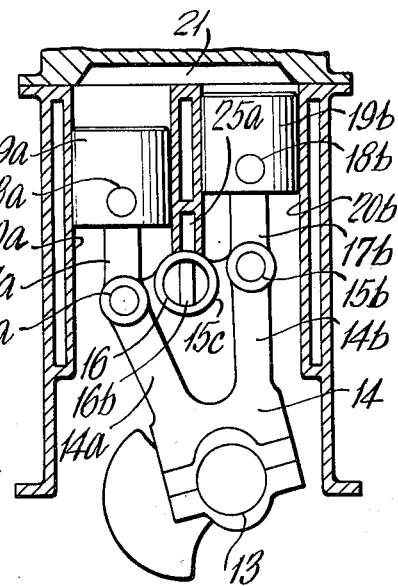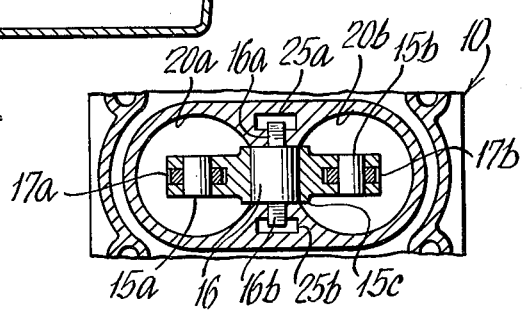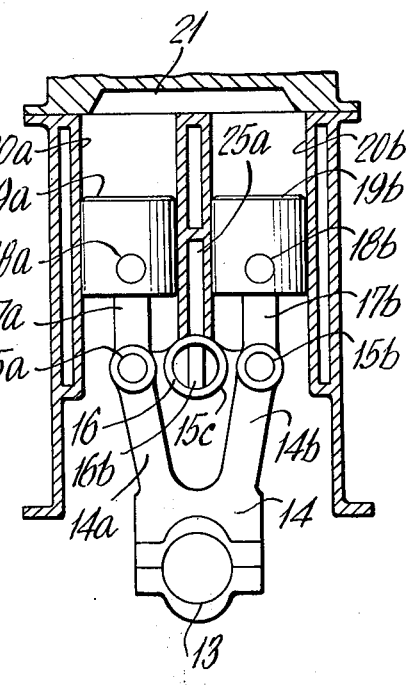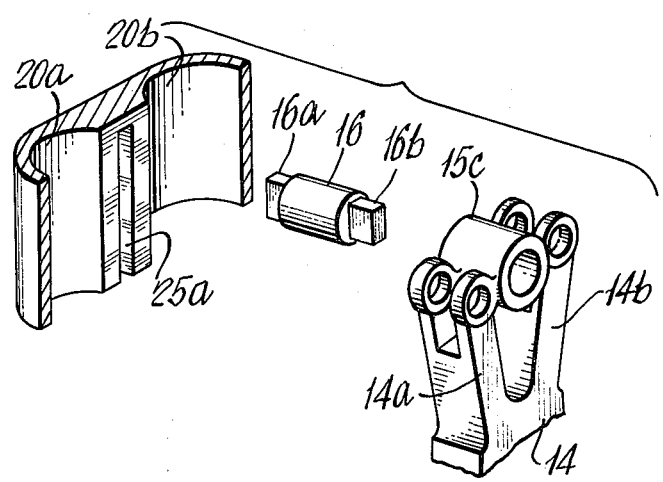

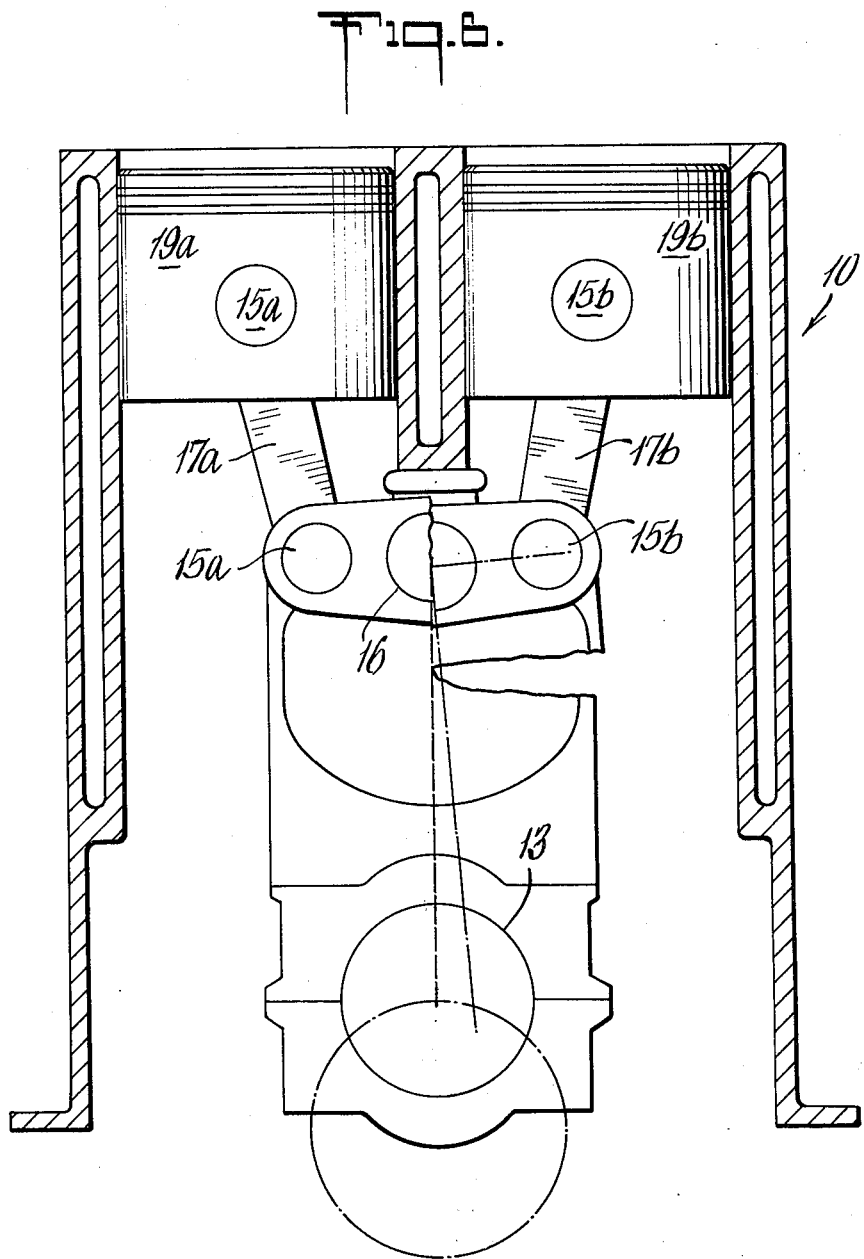

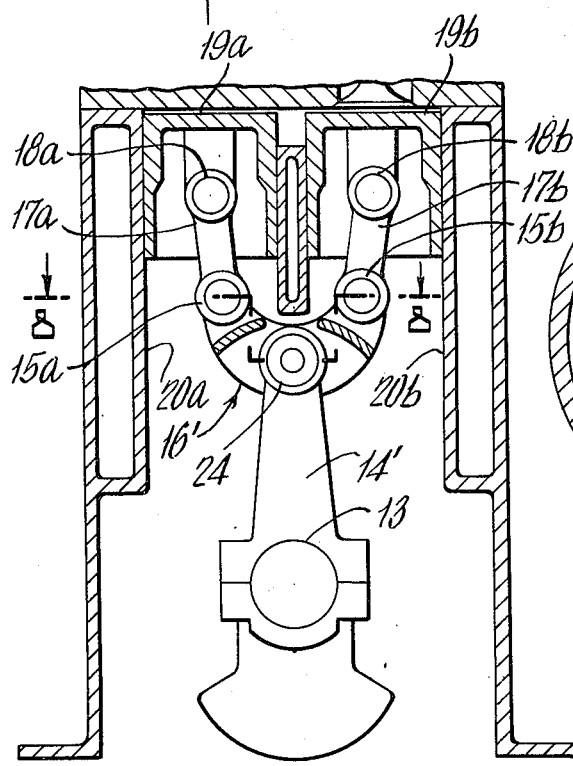
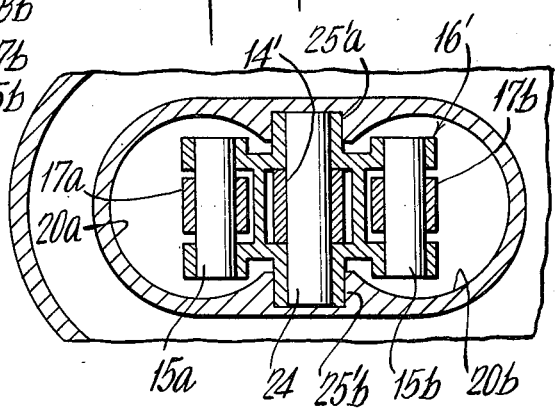
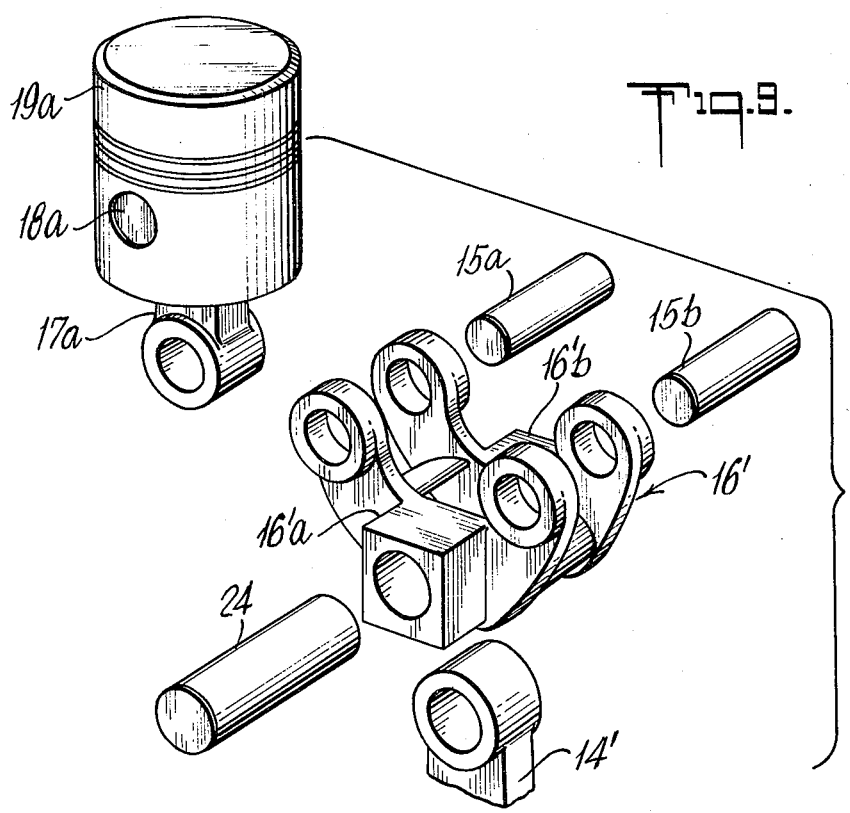

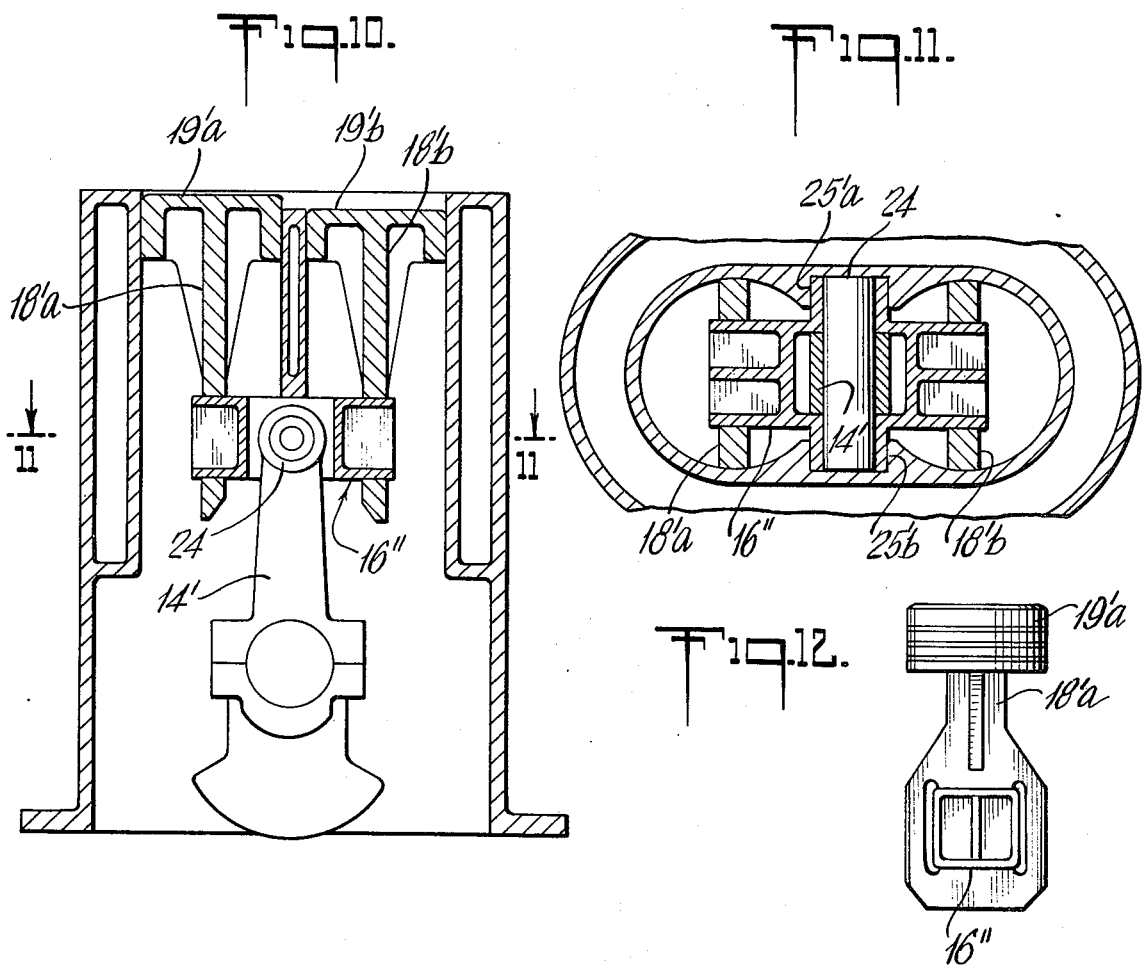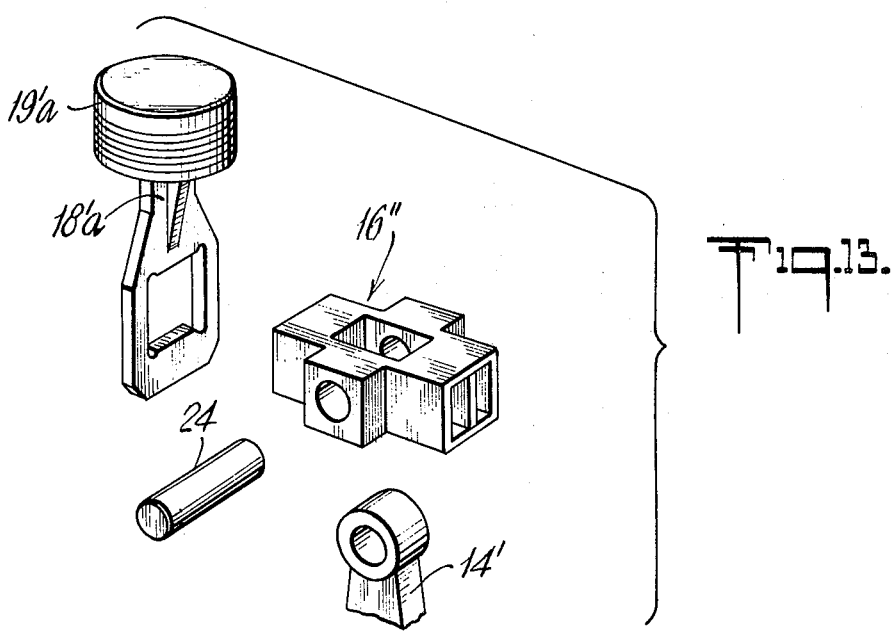

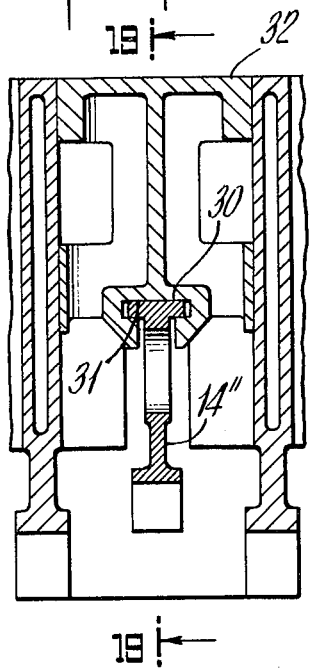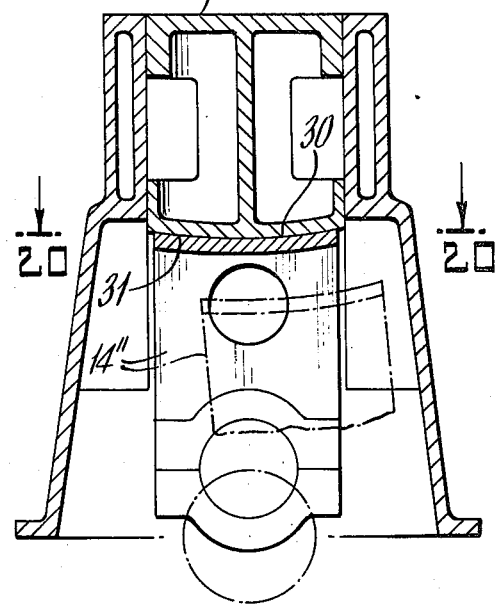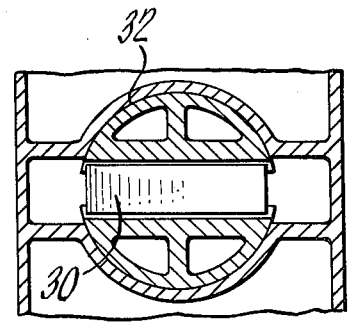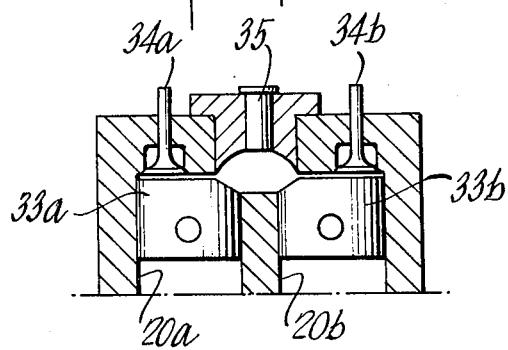

CONNECTING ROD AND CONNECTING ROD SYSTEMS FOR INTERNAL COMBUSTION ENGINE AND COMPRESSORS AND PARTITIONED CYLINDER FOR INTERNAL COMBUSTION ENGINE

This invention relates to connecting rods for internal combustion engines and compressors.

U-cylinder engines and compressors, particularly engines, are advantageous in that they provide a greater displacement in the same engine dimensions or, conversely, the same displacement in smaller engine dimensions as compared with an in-line or V arrangement of conventional cylinders, as typified by a 6-in-line engine or a V-8 engine.

A major disadvantage, however, of all heretofore proposed U-cylinder engines has been that the pair of pistons for the U-cylinder are not in phase at the top of the stroke, i.e., the pistons do not reach their utmost extension into the cylinders simultaneously, resulting in substantial inefficiency.

It is an object of the invention to provide a connecting rod system for U-cylinder engines or compressors of such design that the pistons are in phase at the top of the stroke, i.e., the pistons reach their utmost extension into the cylinders simultaneously. It is also an object of the invention that the connecting rod system eliminate piston slap, i.e., the slapping of the piston against the walls of the cylinder due to the fact that in conventional connecting rod systems the reciprocatory motion imparted to the piston is not perfectly axial. It is a further object of the invention to provide a U-cylinder engine with a partition in one of the cylinders to form a total of three compartments in the U-cylinder, thereby particularly adapting the U-cylinder to operation with stratified charges. Another object of the invention is to provide a novel connecting rod for a piston in a conventional cylinder in which side thrust on the piston and piston vibration are minimized. Other objects and advantages of the invention will become apparent from the following description thereof.

According to one aspect of the invention, an improved rod system is provided in an engine or compressor having an inverted U-cylinder, each arm of the U forming a respective cylinder and the remainder of the U communicating with the respective cylinders and forming a common compression chamber for the respective cylinders, a respective piston slidably received in each of the respective cylinders for reciprocation therein, a crank shaft and a crank pin mounted on the crank shaft, the axes of the respective cylinders lying in a common plane and the respective axes of the crank shaft and the crank pin being substantially perpendicular to the common plane. The improved connecting rod system comprises a main connecting rod one end of which is connected to the crank pin, a cross head, means mounting the cross head for reciprocation parallel to the axes of the respective cylinders and in the common plane, the other end of the main connecting rod being connected to the cross head, and first and second auxiliary connecting rods each connecting the main connecting rod or the cross head to a respective one of the pistons. Generally, the cross head is bisected by a plane which bisects the U substantially perpendicularly to the common plane. The connecting rod system may include means mounting the main connecting rod for pivotal movement about the cross head. In that case, the system may further comprise means connecting each of the auxiliary rods to the main rod for pivotal movement about respective axes parallel to and on opposite sides of the bisecting plane. Alternatively, the connecting rod system may include an arcuate rail rigidly connected to the end of the main connecting rod opposite the end of the main connecting rod which is connected to the crank pin and an arcuate groove may be formed in the cross head and the rail may be slidably received in the groove. In this latter case, the auxiliary connecting rods may be hinged to the cross head.

In order to take further advantage of the in-phase configuration of the pistons at the top of the stroke, one of the pistons may be provided at its free end with a central elevation to impart a vortical flow to the air-fuel mixture. Another way of taking advantage of the novel connecting rod systems of the invention is to provide in one of the respective cylinders a partition in a plane substantially parallel to the axes of the respective cylinders and a slot in the corresponding piston for slidably receiving the partition. The U-cylinder is, thus, effectively divided into three compartments, which configuration lends itself to the implementation of stratified charge techniques of fuel introduction, particularly when the partition is parallel to the bisecting plane. Thus, there may be provided a pre-chamber in communication with the portion of the divided cylinder on the side of the partition remote from the bisecting plane, a first inlet valve communicating with the pre-chamber, igniting means, such as a spark plug, operatively associated with the pre-chamber for igniting a mixture of fuel and air introduced into the pre-chamber through the first inlet valve, and a second inlet valve communicating with the portion of the divided cylinder on the other side of the partition. In this arrangement, the other respective cylinder would normally be provided with an outlet valve.

Yet another aspect of the invention is a novel connecting rod for providing slap-free reciprocation of the piston in a conventional cylinder. Here, an arcuate rail is rigidly connected to the end of the connecting rod remote from the crank shaft and an arcuate groove formed in the piston slidably reveives the rail. There is, thus, provided a connecting rod having a very great effective length, the center of the arcuate path in which the rod moves being substantially above the top of the piston. This minimizes side thrust on the piston and piston vibration.

The invention shall now be further described by reference to specific embodiments thereof, as illustrated in the drawings, in which:

FIG. 1 is a partially sectional front elevation of an internal combustion engine block containing a U-cylinder provided with a connecting rod system of the present invention;

FIG. 2 is a section taken on section line 2—2 of FIG. 1;

FIG. 3 is an exploded isometric view of part of the assembly of FIGS. 1 and 2;

Figure 14:
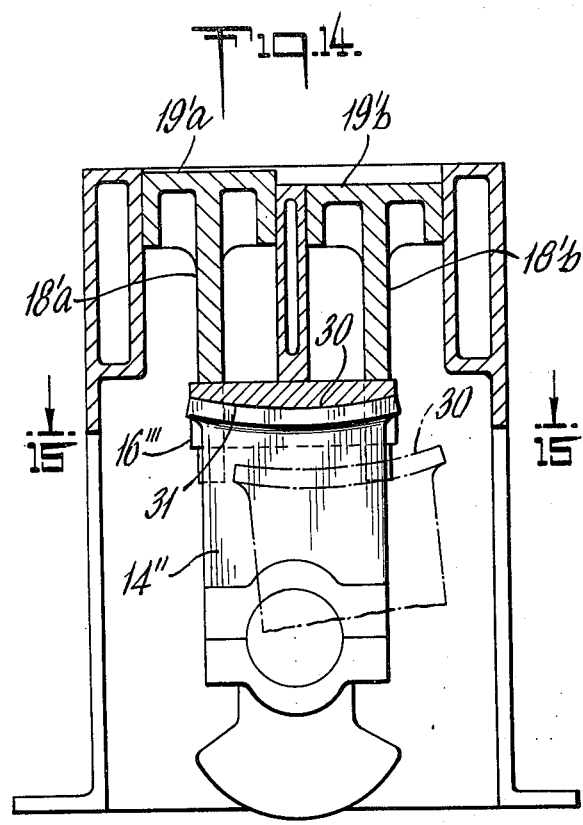
Figure 15:
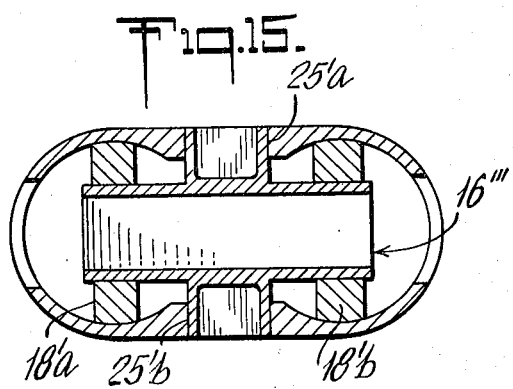
Figure 16:
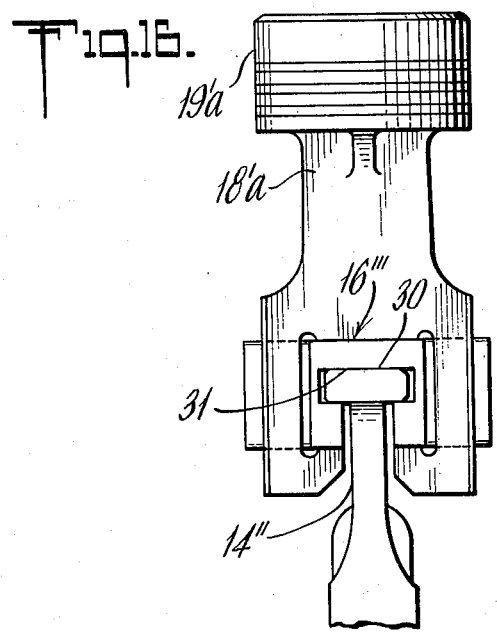
Figure 17:
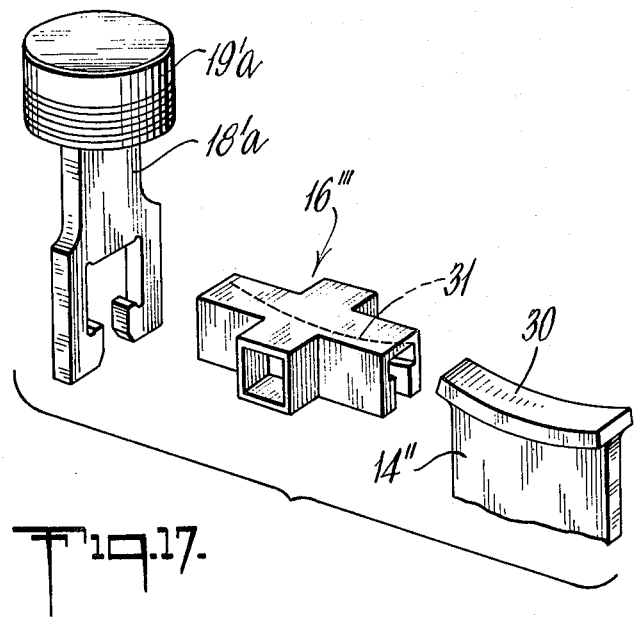
Figure 22:
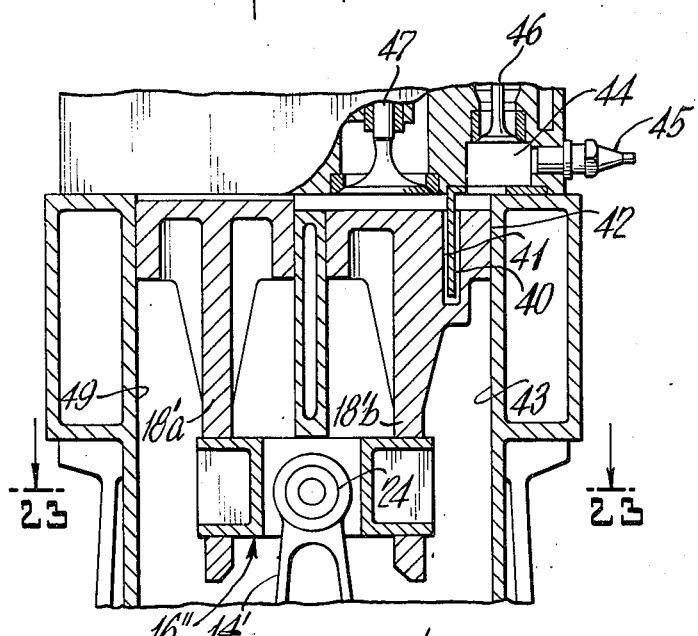
Figure 23:
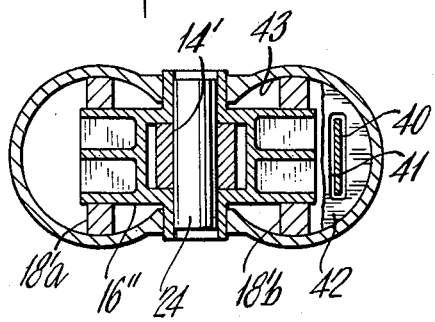
Figure 24:
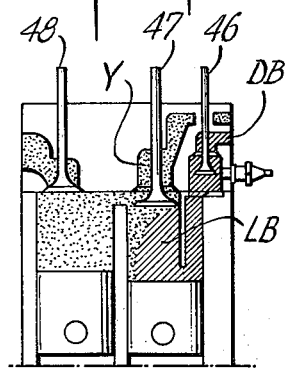

FIG. 4 and FIG. 5 generally correspond to the portion of FIG. 1 illustrating the present invention but with the system in moved positions and the left hand cylinder not provided with a central elevation as in FIG. 1;

FIG. 6 generally corresponds to FIG. 1 but without a central elevation on the left hand piston and with the right hand portion of the figure showing a moved position from the left hand portion of the figure;

FIG. 7 illustrates in sectional front elevation a U-cylinder having another connecting rod system according to the invention;

FIG. 8 is a section taken on section line 8—8 of FIG. 7;

FIG. 9 is an exploded isometric view of the connecting rod system and one of the pistons of FIGS. 7 and 8;

FIG. 10 corresponds generally to FIG. 7 but illustrates another embodiment of the invention;

FIG. 11 is a section taken on section line 11—11 of FIG. 10;

FIG. 12 is an elevation of a piston of the assembly of FIG. 10;

FIG. 13 is an isometric exploded view of the assembly of FIG. 10;

FIG. 14 generally corresponds to FIG. 10 but illustrates yet another embodiment of the invention and also shows a moved position of that embodiment;

FIG. 15 is a section taken on section line 15—15 of FIG. 14;

FIG. 16 is an elevation of a portion of the assembly of FIG. 14;

FIG. 17 is an isometric exploded view of the assembly of FIG. 14;

FIG. 18 is an axial section of yet another embodiment of the invention;

FIG. 19 is a section taken on section line 19—19 of FIG. 18 and also showing a moved position;

FIG. 20 is a section taken on section line 20—20 of FIG. 19;

FIG. 21 is a schematic illustration of a portion of the cylinders and of the pistons of a U-cylinder diesel engine which may incorporate the present invention;

FIG. 22 is a partial section of an embodiment of the invention also incorporating a pre-chamber provided with an inlet valve and a spark plug so that the engine is adapted for stratified charge operation;

FIG. 23 is a section taken on section line 23—23 of FIG. 22; and

FIGS 24—29 schematically illustrate the arrangement of FIG. 22 in various stages of operation.

With reference to FIG. 1, there is illustrated an engine block 10 including a crank case 11 containing a crank shaft 12 on which is pivotally mounted a crank pin 13. Fixed to the crank pin 13 is a bifurcated main connecting rod 14 having arms 14a and 14b and which is pivotally connected by means of annular element 15c to a cross head 16. Pivotally connected to the respective arms 14a, 14b of the main connecting rod 14, by means of the pins 15a, 15b, are respective auxiliary connecting rods 17a, 17b. The other ends of the respective auxiliary connecting rods 17a, 17b are pivotally connected to respective pistons 19a, 19b by means of respective pins 18a, 18b. The pistons 19a, 19b are slidably received for reciprocation in the respective cylinders 20a, 20b formed by the arms of an inverted U-cylinder the top chamber 21 of which inverted U-cylinder communicates between the respective cylinders 20a, 20b and defines a common compression chamber therefor. Associated with the the compression chamber 21 is an inlet poppet valve for admission of a fuel-air mixture and an outlet poppet valve 22b for exit of the exhaust gases. Of course, a spark plug or other igniting means (not illustrated) is also provided to ignite the fuel-air mixture in the compression chamber 21. It will be understood that in a typical engine for an automobile a serial arrangement of three or four of such U-cylinders might be provided. In the embodiment illustrated the piston 19a is provided with a central elevated portion 23 so that an annular space is defined between the elevated portion 23 and the walls of the compression chamber 21 in proximity to the inlet valve 22a to impart a vortical motion to the fuel-air mixture admitted into the compression chamber 21. This tends to promote a more efficient combustion, reducing pollutant emissions and increasing gas mileage.

FIG. 1 illustrates the connecting rod system of the invention with the pistons 19a, 19b at the top of the stroke, i.e., with the axis of the crank pin 13 at a 12 o'clock or zero degree position relative to the axis of the crank shaft 12. It is to be noted that the pistons 19a, 19b are in phase. It can be seen that the axes of the respective cylinders 20a, 20b lie in a common plane and the respective axes of the crank shaft 12 and the crank pin 13 are substantially perpendicular to the common plane. The cross head 16 is provided with rectilinear extensions 16a, 16b which are received in respective slots 25a, 25b parallel to the axes of the cylinders 20a, 20b for reciprocation of the cross head parallel to the axes of the cylinders 20a, 20b (FIGS. 2, 3). This system eliminates the rocking of the pistons commonly known as piston slap. It is also evident that the cross head 16 is bisected by a plane which bisects the U of the U-cylinder substantially perpendicularly to the aforementioned common plane. Hence, the axis about which the cross head 16 rotates lies in the bisecting plane. The axes of the pins 15a, 15b are parallel to and are on opposite sides of the bisecting plane. It is also evident that the cross head is symmetrical.

FIG. 4 shows a connecting rod system like that of FIG. 1 with the crank shaft rotated about 70° clockwise from the position shown in FIG. 1. Here, however, one of the cylinders is not provided with a raised central portion, as this is an optional feature. In FIG. 5, the crank shaft is rotated clockwise an additional 110° to a position 180° from that illustrated in FIG. 1. Here, at the bottom of the stroke, as at the top of the stroke, the pistons 19a, 19b are in phase.

From FIG. 6 it can be appreciated how the present invention provides that the pistons be in phase at the top of the stroke. The left hand portion of FIG. 6 illustrates the configuration of the system at the 0° position of the crank pin and the right hand portion of FIG. 6 illustrates the configuration of the system at a clockwise rotation of the crank pin of a few degrees. From this it can be seen that the system provides a lost motion whereby the right hand piston is at the top of the stroke from the 0° to the plus few degrees position of the crank pin and, similarly, the left hand piston would be at the top of the stroke from the 0° position of the crank pin to the minus few degrees position of the crank pin.

It will be appreciated that the connecting rod system of FIGS. 1–6 is particularly suitable for a 2-cycle engine provided with ports rather than valves, in which it is necessary that the pair of pistons be at different positions between the top and the bottom of the stroke.

The embodiment of FIGS. 7–9 is similar to the embodiment of FIGS. 1–6 with some differences in design, so that the pistons are at the same positions relative to each other throughout the stroke, which is suitable for a 4-cycle engine or a 2-cycle engine provided with valves in the head. Here, the main connecting rod 14' is not bifurcated and the cross head 16', which is provided with the rectilinear extensions to be slidably received in slots 25'a and 25'b for reciprocation of the cross head, is bifurcated.

In the embodiment of FIGS. 10-13, in which, too, the pistons move together, the main connecting rod 14' is pivotally connected by means of the pin 24 to a cross head 16" on which are hinged the auxiliary connecting rods 18'a, 18'b, the other end of which rods are rigidly connected to the respective pistons 19'a, 19'b. In the particular embodiment illustrated in FIG. 10, piston 19'b is of lesser height than piston 19'a so that in compression a vortical flow of gases will be produced, to increase the efficiency of combustion. In the hinging arrangement, a substantial clearance is provided between the opening in the auxiliary connecting rod and the cross head only parallel to the axis of the cross head. Accordingly, the piston is permitted to move relative to the cross head at right angles to the direction of reciprocation to adjust to dimensional changes in the engine due to heat but is not permitted to move in the direction of reciprocation, thus avoiding excessive noise. More particularly, the piston-auxiliary connecting rod assembly can slide along the cross head and can move parallel to the axis of the crank shaft in either direction relative to the cross head but cannot move parallel to the reciprocation of the piston -auxiliary connecting rod assembly. Such a connection is commonly referred to in machine design as a hinged connection.

In the embodiment of FIGS. 14-17 there is a like difference in the heights of the cylinders 19'a, 19'b which, again, move together throughout the stroke. Here, the cross head 16''', like the cross head 16'', is provided with rectilinear extensions which are received in the grooves 25'a, 25'b for reciprocation of the cross head 16''' parallel to the axes of the cylinders. The auxiliary connecting rods 18'a, 18'b are hinged on the cross head as in the embodiment of FIGS. 10-13. The main connecting rod 14'' in the embodiment of FIGS. 14-17 has integrally formed at the end thereof an arcuate rail 30 which is slidably received in an arcuate groove 31 formed in the cross head 16'''. By sliding of the rail 30 in the groove 31, the cross head 16''' along with the auxiliary rods 19''a, 19''b and the cylinders 19'a, 19'b respectively fixed thereto are reciprocated.

If it is desired to provide a small radius of curvature for the groove 31, for machining purposes it is necessary to fabricate the cross head 16''' in two pieces the assembly of which has a dividing plane such that the axes of the respective cylinders lies therein. After fabrication, the two pieces are fastened together by suitable means, such as screws, so that the cross head in its assembled state is like that illustrated in FIG. 17 but for the presence of a parting line on the dividing plane and screws or other suitable fastening means holding the two pieces together. Another alternative embodiment, not illustrated, is more or less a combination of the embodiment of FIG. 17 with the embodiment of FIG. 9. This would essentially involve the auxiliary connecting rods being connected to the cross head having the arcuate groove by means of pivot pins.

FIGS. 18-20 illustrate a single cylinder, as opposed to a U-cylinder, embodiment utilizing the connecting rod 14'' having the rail 30 of the embodiment of FIGS. 14-17. Here, the arcuate groove 31 in which the rail 30 is slidably received is formed directly in the piston 32. Hence, there is provided a novel connecting rod for the piston in an ordinary single cylinder. For the reason explained hereinabove, the novel connecting rod results in less side thrust on the piston and less piston vibration FIG. 21 illustrates a U-cylinder for a diesel engine in which the respective pistons 33a, 33b in the respective cylinders 20a, 20b have reached the top of the stroke at the same time by the use of a connecting rod system of the present invention. Poppet valves 34a, 34b and fuel injection nozzle 35, which are illustrated in FIG. 21, are conventional for a standard type of diesel engine. Because of the very high compressions necessary for a diesel engine, a connecting rod system of the present invention, by means of which the top of the stroke is reached for both pistons at the same time, first makes practical the use of a U-cylinder in a diesel engine. Likewise, for other internal combustion engines, maximizing compression in both cylinders of the U simultaneously is important; thus, for internal combustion engines in general, the invention has first made use of U-cylinders practical.

FIGS. 22-29 illustrate an embodiment of the invention involving a U-cylinder engine particularly adapted to be operated with a stratified charge. With reference to FIGS. 22 and 23, the connecting rod system is the same as in FIGS. 10-13. The right cylinder, however, is provided with a partition or baffle 40 which is received in a slot 41 provided in the right piston 42. Communicating with the right cylinder 43 is a pre-chamber 44 provided with an igniting means such as a spark plug 45.

An inlet poppet valve 46 communicates with the prechamber 44 on one side of the baffle 40 and an inlet poppet valve 47 communicates with cylinder 43 on the other side of the baffle 40. An exhaust poppet valve 48 communicates with the left cylinder 49 (FIGS. 24-29).

Figure 25:
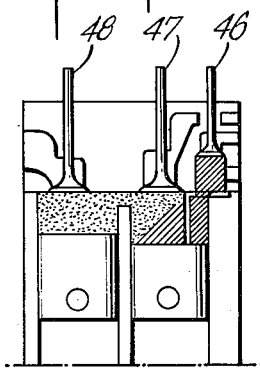
Figure 26:
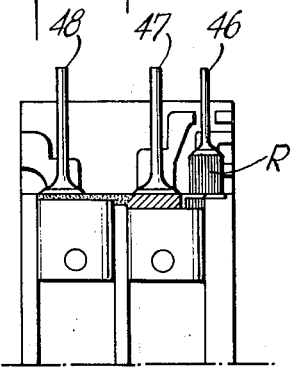
Figure 27:
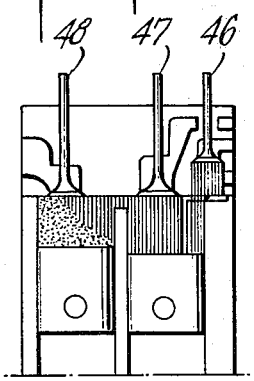
Figure 28:
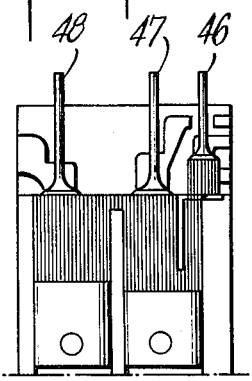
Figure 29:
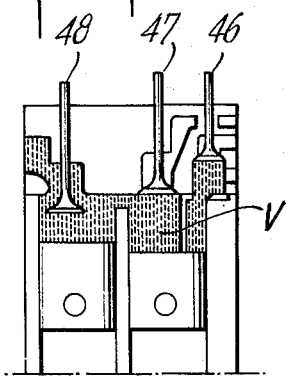

FIGS. 24-29 illustrate, respectively, the end of the intake stroke, midway in the compression stroke, ignition, midway in the expansion stroke, the end of the expansion stroke, and midway in the exhaust stroke. The cylinder contents are color coded with different types of hatchings designated DB (dark blue), LB (light blue), R (red) and V (violet). DB denotes a rich fuel mixture (low ratio of air to fuel), Y designates a lean fuel mixture (high ratio of air to fuel), LB designates a medium fuel mixture (intermediate ratio of air to fuel), V designates exhaust gases and R designates combustion. In the intake stroke (FIG. 24) rich mixture is admitted into pre-chamber 44 by opening valve 46 and lean mixture or air is admitted into cylinders 43 and 29 by opening valve 47. The partition 40 assists stratification of the mixture into rich, medium and lean with, of course, shades of gradation (not illustrated) therebetween. The valves 46, 47 close and the compression stroke takes place (FIG. 25). At the end of the compression stroke, ignition takes place in the pre-chamber 41 (FIG. 26). The combustion spreads from right to left in the cylinders 43, 49 and the expansion stroke is underway (FIG. 27). Combustion spreads to the entire mixture and the end of the expansion stroke is reached (FIG. 28). The exhaust valve 48 then opens and the exhaust stroke pushes the exhaust gases out of the cylinders. The general principle of such an engine is known in connection with Honda's CVCC (compound vortex controlled combustion) engine. However, in the present invention not only are the aforementioned advantages of a U-cylinder engine attained but, also, the baffle 40 assists in controlling the stratification

What is claimed is:

1. In an engine or a compressor having an inverted U-cylinder, each arm of the U forming a respective cylinder and the remainder of the U communicating with the respective cylinders and forming a common compression chamber for the respective cylinders, a respective piston slidably received in each of the respective cylinders for reciprocation therein, a crank shaft and a crank pin mounted on the crank shaft, the axes of said respective cylinders lying in a common plane and the respective axes of the crank shaft and the crank pin being substantially perpendicular to the common plane, the improvement comprising a main connecting rod one end of which is connected to the crank pin, a cross head, means mounting the cross head for reciprocation parallel to the axes of the respective cylinders and in the common plane, the other end of the main connecting rod being connected to the cross head, and first and second auxiliary connecting rods each rigidly connected to a respective one of said pistons and each hingedly connected to said cross head.

2. In an engine or compressor according to claim 1, in the improvement in which the cross head is bisected by a plane which bisects the U substantially perpendicularly to said common plane.

3. In an engine or compressor according to claim 2, the improvement in which further comprises means mounting the main connecting rod for pivotal movement about the cross head.

4. In an engine or compressor according to claim 2, the improvement in which further comprises an arcuate rail rigidly connected to the other end of the main connecting rod and an arcuate groove formed in the cross head and slidably receiving the rail.

5. In an engine according to claim 1, the improvement in which further comprises an elevation formed in the center of the free end of one of the pistons.

6. In an engine or compressor according to claim 1, the improvement wherein said first and second auxiliary connecting rods are formed integrally with respective ones of said pistons.

7. In an engine or compressor as claimed in claim 1, the improvement wherein each said auxiliary connecting rod has an opening in which a portion of said cross head is received to hingedly connect said cross head and each said connecting rod.

8. In an engine or compressor as claimed in claim 7, the improvement wherein said openings are generally rectangular and said portions of said cross head are correspondingly shaped to be received in said openings.

9. In an engine or compressor as claimed in claim 8, the improvement wherein clearances between said openings and said portions of said cross heads are provided to constitute means accommodating expansion of said connecting rods normal to the direction of movement of said piston.

10. In a system comprising a piston, a crank shaft and a connecting rod one end of which is connected to the crank shaft and the other end of which is connected to the piston, the improvement comprising an arcuate rail rigidly connected to the other end of the connecting rod and an arcuate groove formed in the piston and slidably receiving the rail.

11. In an engine or a compressor having an inverted U-cylinder, each arm of the U forming a respective cylinder and the remainder of the U communicating with the respective cylinders and forming a common compression chamber for the respective cylinders, a respective piston slidably received in each of the respective cylinders for reciprocation therein, a crank shaft and a crank pin mounted on the crank shaft, the axes of said respective cylinders lying in a common plane and the respective axes of the crank shaft and the crank pin being substantially perpendicular to the common plane, the improvement comprising a main connecting rod one end of which is connected to the crank pin, a cross head, means mounting the cross head for reciprocation parallel to the axes of the respective cylinders and in the common plane, the other end of the main connecting rod being connected to the cross head, and first and second auxiliary connecting rods each being hinged to the cross head and each being rigidly connected to a respective one of said pistons.

12. In an engine or compressor according to claim 11, in the improvement in which the cross head is bisected by a plane which bisects the U substantially perpendicularly to said common plane.

13. In an engine or compressor according to claim 12, the improvement in which further comprises means mounting the main connecting rod for pivotal movement about the cross head.

14. In an engine or compressor according to claim 12, the improvement in which further comprises an arcuate rail rigidly connected to the other end of the main connecting rod and an arcuate groove formed in the cross head and slidably receiving the rail.

* * * * *